Figure 1:
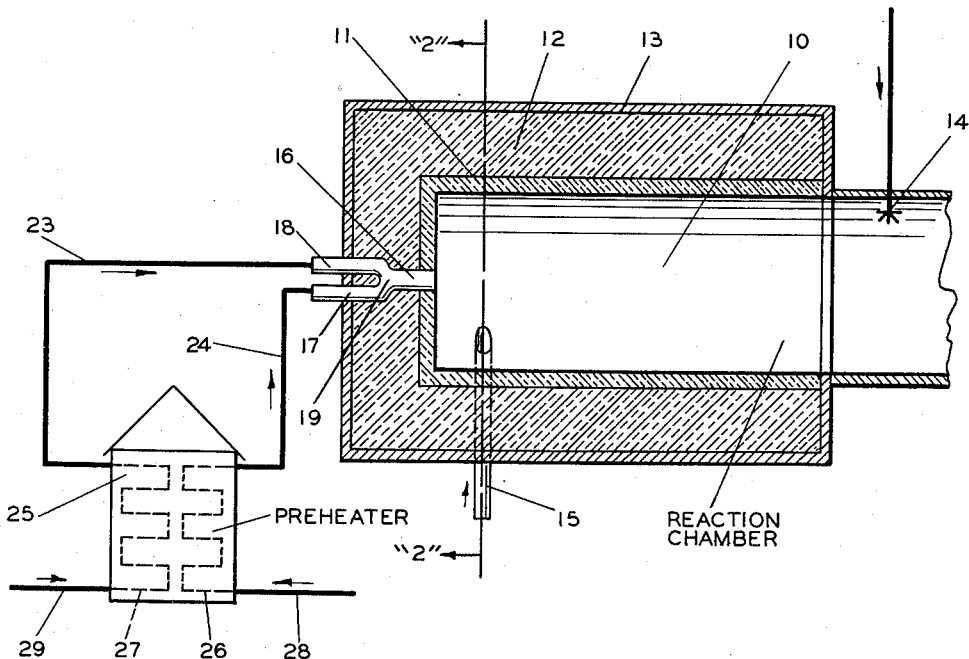

May 29, 1945.  J. C. KREJCI  2,377,245

PROCESS FOR PRODUCING ACETYLENE

Filed Dec. 3, 1943

INVENTOR
J. C. KREJCI
BY
ATTORNEYS

Patented May 29, 1945

2,377,245

UNITED STATES PATENT OFFICE 2,377,245

PROCESS FOR PRODUCING ACETYLENE

Joseph C. Krejci, Kaw, Okla., assignor to Phillips Petroleum Company, a corporation of Delaware Application December 3, 1943, Serial No. 512,798

6 Claims. (Cl. 260—679)

This invention relates to a process for producing unsaturated hydrocarbons such as acetylene and ethylene by thermal decomposition of carbonaceous gases and vapors.

This application is a continuation-in-part of my copending application, Serial No. 424,084, filed December 22, 1941.

In the past the most serious problem encountered by investigators in the field of hydrocarbon gas cracking at high temperatures to unsaturated hydrocarbons has been carbon deposition in the reaction zone, which necessarily made the processes intermittent in operation and which was objectionable in other respects. In the processes in which heat was transferred to the reactant gas through refractory materials several other difficulties were encountered. In most cases large quantities of heat had to be transferred due to the highly endothermic nature of the reaction. The reaction temperature was high, which necessitated the use of highly refractory materials, many of which have a low heat conductivity. This made the transfer of large quantities of heat very difficult. To make matters worse, carbon which deposited on the refractory surfaces insulated them and made the heat transfer problem even more difficult. In another cracking process in the prior art the difficulties with carbon deposition and heat transfer were partially eliminated by resorting to intermittent operation of reactors of the regenerative type. Most of the carbon which deposited on the refractory surfaces during cracking was burned off during the heating part of the cycle. However, heat transfer was still a problem in this type of operation because heat had to be stored in the refractory material during heating and released during cracking. Only special refractories were suitable, those having both high heat capacity and high heat conductivity. Such refractories are very scarce. Intermittent operation had several disadvantageous. For example, the equipment was utilized only part of the time, and the temperature during the cracking period was variable.

I have found that modifications of the process disclosed in the afore-mentioned copending application can be used to produce special hydrocarbons such as acetylene. The broad principles of my process for producing hydrocarbons are the same as those of the process for producing carbon black previously disclosed. However, certain significant changes in reaction chamber design, temperature and time of reaction, velocity of flow of gases in the reaction chamber, and other conditions of operation are required to convert my carbon black process into a process for producing special hydrocarbons. Also, the conditions of operation vary with the hydrocarbon desired as the principal product.

In one embodiment my process for producing special hydrocarbons comprises continuously introducing a stream of reactant carbonaceous gas or vapor at approximately the center of the inlet end wall of a cylindrical reaction chamber having an inlet end wall and an open outlet end, the reactant gas or vapor being introduced in a direction parallel to the longitudinal axis of the chamber; introducing a mixture of gaseous fuel and air into the chamber through burner ports so positioned in the sidewall of the chamber as to direct the flow of the mixture of fuel and air in a direction tangent to the inner surface of the chamber sidewall and approximately perpendicular to the longitudinal axis of the chamber, the mixture of fuel and air being introduced through the burner ports at a sufficiently high velocity and in sufficient quantity to maintain by centrifugal force a layer of flame and combustion products adjacent the inner surface of the chamber sidewall, thus forming a separating layer of flame and combustion products between the sidewall and the reastant gas or vapor in the central core of the chamber; cooling the effluent from the chamber and separating the desired hydrocarbons from the products of combustion.

It is an object of this invention to provide a continuous process for the manufacture of acetylene by subjecting a hydrocarbon feed stock to controlled conditions of time, temperature and pressure, and arresting the reactions by quenching the effluents before undesired decomposition and polymerization can occur.

Another object of this invention is to provide a continuous process for producing acetylene without carbon deposition in the reaction zone. This has been accomplished by separating the reactant gas and the wall of the reaction chamber by a blanket of gas positioned next to the wall by centrifugal force. In other words, the reaction is kept out of contact with solid surfaces. This has several advantages besides permitting continuous operation. Thus, it minimizes decomposition to carbon because solid surfaces, and particularly any carbon deposited on them, have a tendency to catalyze the decomposition of hydrocarbons to carbons.

Still another object of this invention is to provide a process for producing acetylene in which heat is transferred from the heat-generating zone to the heat-consuming zone without the difficulties encountered in former processes. In my process all heat is transferred by radiation and convection and is not required to pass through solid materials. The reaction chamber wall is literally heated continuously on the inside. With respect to the composition of the walls of the chamber, the main requirement is that they be refractory enough to withstand the temperature required by the reaction. The heat conductivity and the heat capacity of the materials comprising the walls are of secondary importance.

Still other objects and advantages will be apparent to those skilled in the art from the following description and disclosure.

Figure 2:
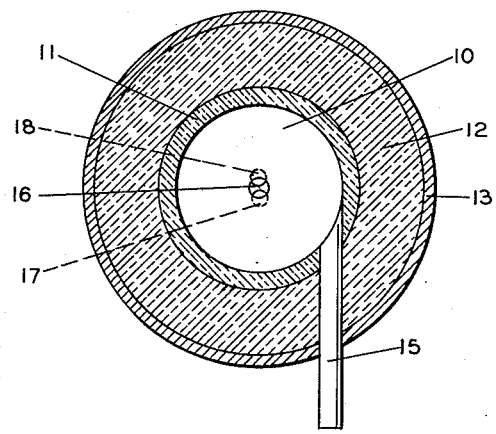

In the accompanying drawing, which is a part of this specification and illustrates preferred forms of the apparatus for carrying out my invention, Figure 1 shows a longitudinal section of a preferred form of the reaction chamber taken along line 1—1 of Figure 2 and the preheating equipment in diagrammatic form, and Figure 2 is a cross-section of the same form of the reaction chamber taken along line 2—2 of Figure 1.

Referring to the drawing, cylindrical reaction chamber 10 has an insulated inlet end wall, an insulated sidewall, and an open outlet end. The sidewall and the inlet end wall are composed of lining 11 of a highly refractory material such as sillimanite, layer of insulation 12, and steel shell 13. A hydrocarbon gas or vapor, to be referred to hereinafter as reactant gas, enters the system through pipe 29, is preheated in coil 27 in preheater 25, and is carried into arm 18 of Y-tube 19 by pipe 23. Similarly, an $O_2$-bearing gas such as air, to be referred to hereinafter as reactant air, passes through pipe 28, preheat coil 26, pipe 24, and arm 17 of the Y-tube. The preheated gas and air are mixed in refractory tube 16, which is positioned in the center of the inlet end wall and which directs the reactant mixture in a direction parallel to the longitudinal axis of the chamber. In this case tube 16 serves as a mixing tube and also as the chamber inlet tube. However, if the use of reactant air is omitted, the tube extends through the insulation to the steel shell and serves only as the chamber inlet tube. A mixture of air and a fuel gas or air alone (to be referred to hereinafter as tangential gas) enters the reaction chamber through one or more burner ports 15 so positioned in the sidewall of the chamber as to direct the tangential gas tangentially with respect to the inner surface of the sidewall and approximately perpendicularly with respect to the longitudinal axis of the chamber. The tangential gas enters the chamber at a sufficiently high velocity and in sufficient volume to maintain by centrifugal force a helically-flowing blanket of flame and combustion products between the sidewall and the reactant gas flowing in the central core of the chamber. The effluent from the chamber passes through its open outlet end into pipe 21 in which it is cooled by spray 14. The product is recovered from the effluent by any suitable means, such as by absorption, fractionation, or the like.

I have found that, in general, with all other conditions constant, the chamber required for producing a hydrocarbon such as acetylene is shorter than for producing carbon black. In other words, when producing acetylene the reaction is stopped before reaching the stage which gives the maximum yield of carbon. As described in my aforementioned copending application, I have produced good yields of carbon black in a reaction chamber 9½ inches in diameter and 46 inches in length when using as reactant gas a natural gas which contained 35 pounds of carbon per 1000 cubic feet and which was preheated to 1500–2000° F. This chamber had three tangential ports 1½, 1½, and 1 inch in diameter located 1, 6 and 11 inches from the inlet end of the chamber, respectively. Angularly, the middle burner was positioned 180 degrees from the other two. When producing carbon black in high yield the end gas had a negligible amount of acetylene. However, with all conditions the same but without any preheat, a very low yield of carbon was obtained, but the end gas had an appreciable amount of acetylene (1.4 per cent by volume, dry basis). In this experiment omitting the preheat had somewhat the same effect as shortening the chamber because, with less heat stored in the reactant gas, a longer chamber is required to bring the reaction to any given stage. In this experiment 1200 cubic feet per hour of natural gas was used as reactant gas and a mixture of 820 cubic feet per hour of natural gas and 9020 cubic feet per hour of air (all at atmospheric temperature) was used as tangential gas. The tangential gas was so divided among the three tangential burner ports as to give the same linear velocity in all of them. The reactant gas entered the chamber through a tube 3 inches in inside diameter. The effluent was quenched a few inches downstream of the outlet end of the chamber.

In the above experiment no carbon deposited in the reaction chamber. The helically-flowing protective blanket on the inside surface of the chamber sidewall made possible continuous operation without carbon deposition.

Convection played an important part as a means of heat transfer in the above experiment. Gradual mixing between the helically-flowing flame and the axially-flowing reactant gas constituted a means of direct transfer of heat. Sufficient tangential gas above that which was mixed with the reactant gas was used to form the protective blanket on the sidewall throughout the length of the chamber. The other important means of heat transfer was radiation. A considerable quantity of heat was transferred to the reactant gas by radiation from the helical flame and from the sidewall of the chamber.

Although the conversion to acetylene in the above experiment was fairly good (11 pounds of acetylene per 1000 cubic feet of reactant gas or a 29 per cent conversion of the carbon in the reactant gas to acetylene), the concentration of acetylene in the end gas was low. However, the result does not appear to be bad at all when it is considered that the reactant gas was not rich in hydrocarbons above methane and that all heat used in the conversion had to be developed within the reactor, with no preheat used on either the reactant gas or the tangential gas. Of course, as is evident from the discussion above, if the reactant gas had been preheated, a shorter reactor would have been necessary to give maximum acetylene yield.

In the above experiment the temperature in the reaction chamber was about 2000° F. and the time of reaction about 0.1 second. When producing acetylene from hydrocarbons such as ethane, propane, or butane, a suitable temperature is in the range 2000–2600° F., with a suitable time of reaction in the range 0.1 to 0.005 second.

In general I prefer to operate at a high temperature and a short reaction time because smaller reaction chambers are required. The high temperature is not objectionable in my process as the temperature is limited only by the refractories used. I have operated continuously reaction chambers lined with sillimanite at 2600–3000° F. In some cases these higher temperatures are required, such as when converting methane to acetylene at a short reaction time.

In this process the method of heat transfer can be controlled. When producing acetylene or olefins large quantities of heat are consumed by the reaction; and for this reason it is desirable to use convection transfer to a large extent to lessen the load on radiation transfer. This can be done by operating the reactor under highly turbulent conditions, with considerable mixing between the helical gas and the axial gas. One easy way to control the mixing between the two gas phases is by varying the linear downstream velocity of the gases in the reaction chamber. Increasing this velocity increases the turbulence and mixing. If desired, the time of reaction can be kept constant as this velocity is varied by making appropriate changes in the length of the reactor. When considerable mixing between the two gas phases is used, it is advantageous to make it as rapid as possible so as to minimize local hot spots in which there would be a possibility for the reaction to go all the way to carbon. Incidentally, lowering the partial pressure of the reactant gas by dilution with gases from the helical stream favors the conversion to acetylene and olefins.

The reactant gas can be not only preheated but it also can be precracked to hydrocarbons such as olefins to increase the yield of the desired hydrocarbon. Hydrogen can be mixed with the reactant gas to favor the conversion to acetylene.

There are several other methods of increasing the concentration of the desired hydrocarbon in the effluent gas. One is to use an easily-recoverable gas such as carbon dioxide as part of the tangential gas fed into the chamber, principally as a replacement for the nitrogen in the air ordinarily used, recover the gas from the effluent gas, and recirculate it into the chamber. Another method is to withdraw the gas flowing axially in the chamber, which is rich in the desired hydrocarbon, and at least a part of the helical flame and combustion products as separate streams from the process.

In another modification of the process the preheated reactant air and the preheated reactant gas are mixed rapidly in a small tube and then enter a small intermediate reaction or soaking chamber in which the gas is subjected to further preheating and precracking by heat generated by combustion of a part of the gas. Tangentially-fed gases are not required in this intermediate chamber. The time of residence in the chamber is so short that no appreciable conversion to carbon can take place. This chamber preferably serves also as the inlet tube to the main chamber in which the helical flame principle is employed.

The effluent from the reaction chamber can be cooled by any suitable means, such as by a water spray. It is advantageous to cool the effluent rapidly to arrest the reaction and prevent loss of the desired hydrocarbon by decomposition or polymerization. This is particularly important when producing acetylene or olefins.

Relating to the apparatus, it is not intended to limit the chamber and other parts of the equipment to the particular design shown in the drawing. Thus, more than one tangential burner can be used. In fact, in chambers of large diameter several burners are required to adequately protect the chamber wall with a helically flowing blanket.

The process is not limited to the use of natural gas as reactant gas. Any of the hydrocarbons of the paraffin series, such as propane or butane, and heavier hydrocarbons such as kerosene, gasoline, or gas oil are suitable as feed stock. Members of the olefin series can be used, as well as those of the benzene and naphthene series. Liquid hydrocarbons, preferably, are vaporized before entering the reaction chamber.

Having thus described my invention, I wish to claim:

1. The process of producing acetylene comprising continuously introducing reactant hydrocarbon at approximately the center of the inlet end wall of an unobstructed reaction chamber having an inlet end wall and a generally cylindrical side wall and an open outlet end, the cross sectional area of the open outlet end being substantially the same as the cross sectional area of the cylindrical reaction chamber, the reactant hydrocarbon being introduced in a direction parallel to the longitudinal axis of the cylindrical chamber; introducing oxygen-containing gas near the inlet end wall through a burner port, said burner port being so positioned as to direct the flow of said oxygen-containing gas in the direction tangent to the inner surface of the chamber side wall and essentially perpendicular to the longitudinal axis of said cylindrical reaction chamber, said oxygen-containing gas and a portion of the reactant gas mixing to form a combustible mixture, burning the combustible mixture to maintain the temperature of the reaction chamber at the acetylene forming temperature of between 2000° F. to 2600° F., the oxygen-containing gas being introduced through said burner port at a sufficiently high velocity and in sufficient quantity to maintain the flame and combustion products by centrifugal force adjacent the whole inner surface of the chamber side wall, thus forming a separating layer of said flame and combustion products between the side wall and the reactant gas mixture in the reaction chamber; immediately shock cooling the effluents of the reaction zone after being in the reaction zone from 0.1 to 0.005 second to a temperature where acetylene is stable and separating the acetylene from the products of combustion.

2. The process of producing acetylene comprising continuously introducing reactant hydrocarbon at a non-peripheral point in the end wall of an unobstructed elongated reaction chamber having an inlet end wall and a generally circular transverse cross-section, and an open outlet end, the reactant hydrocarbon being introduced in a direction parallel to the longitudinal axis of the reaction chamber; introducing oxygen-containing gas into the reaction chamber near the inlet end wall through a burner port, said burner port being so positioned as to direct the flow of said oxygen-containing gas in a direction tangent to the inner surface of the side wall and with the predominating component of motion perpendicular to the longitudinal axis of said cylindrical chamber, burning the mixture of reactant hydrocarbon and oxygen-containing gas to maintain the temperature of the reaction chamber at between 2000° F. to 2600° F., the oxygen-containing gas being introduced through said burner port at a sufficiently high velocity and in sufficient quantity as to maintain by centrifugal force the flame and combustion products produced by the oxygen-containing gas adjacent the whole inner surface of the chamber side wall, thus forming a separating layer of said flame and combustion products between the side wall and the reactant mixture in the reaction chamber, cooling the effluents of the reaction zone after being in the reaction zone from 0.1 to 0.005 second to a temperature where acetylene is stable, and separating the acetylene from the products of combustion.

3. The process of producing acetylene comprising continuously introducing reactant hydrocarbon through the inlet end wall of an unobstructed reaction chamber having an inlet end wall, a side wall having a generally circular transverse cross section and an open outlet end, the cross sectional area of the open outlet end being substantially the same as the cross sectional area of the side wall of the reaction chamber at this point, the reactant hydrocarbon being introduced in a direction parallel to the longitudinal axis of the chamber; introducing sufficient oxygen-containing gas near the inlet end wall through a burner port, said burner port being so positioned as to direct the flow of said oxygen-containing gas in a direction tangent to the inner surface of the chamber side wall and essentially perpendicular to the longitudinal axis of said reaction chamber, said oxygen-containing gas and a portion of the reactant gas mixing to form a combustible mixture, burning the combustible mixture to maintain the temperature of the reaction chamber at between 2000° F. to 2600° F., the oxygen-containing gas being introduced through said burner port at a sufficiently high velocity and in sufficient quantity to maintain the flame and combustion products by centrifugal force adjacent the whole inner surface of the chamber side wall, thus forming a separating layer of said flame and combustion products between the side wall and the reactant hydrocarbon in the reaction chamber, cooling the effluents of the reaction zone after being in the reaction zone from 0.1 to 0.005 second to a temperature where acetylene is stable and separating the acetylene from the products of combustion.

4. The process of producing acetylene comprising continuously introducing a stream of reactant hydrocarbon at approximately the center of the inlet end wall of an unobstructed reaction chamber having an inlet end wall and a generally cylindrical side wall and an open outlet end, the cross sectional area of the open outlet end being substantially the same as the cross sectional area of the cylindrical reaction chamber, the reactant hydrocarbon being introduced in a direction parallel to the longitudinal axis of the cylindrical chamber, introducing a mixture of gaseous fuel and at least sufficient oxygen-containing gas for substantially complete combustion of said gaseous fuel into the reaction chamber near the inlet end wall through a burner port, said burner port being so positioned in the side wall of the cylindrical chamber as to direct the flow of said gaseous fuel in oxygen-containing gas in a direction tangent to the inner surface of the chamber side wall and essentially perpendicular to the longitudinal axis of the said cylindrical reaction chamber, burning the mixture of gaseous fuel and oxygen-containing gas to maintain the temperature of the reaction chamber at between 2000° F. and 2600° F., the mixture of gaseous fuel in oxygen-containing gas being introduced through said burner port at a sufficiently high velocity and in sufficient quantity to maintain the flame and combustion products by centrifugal force adjacent the whole inner surface of the chamber side wall, thus forming a separate layer of said flame and combustion products between the side wall and the reactant hydrocarbon in the reaction chamber, cooling the effluents of the reaction zone after being in the reaction zone from 0.1 to 0.005 second to a temperature where acetylene is stable and separating the acetylene from the products of combustion.

5. The process of producing acetylene comprising continuously introducing methane at approximately the center of the inlet end wall of an unobstructed reaction chamber having an inlet end wall and a generally cylindrical side wall and an open outlet end, the cross sectional area of the open outlet end being substantially the same as the cross sectional area of the cylindrical reaction chamber, the methane being introduced in a direction parallel to the longitudinal axis of the cylindrical chamber, introducing oxygen-containing gas near the inlet end wall through a burner port, said burner port being so positioned as to direct the flow of said oxygen-containing gas in the direction tangent to the inner surface of the chamber side wall and essentially perpendicular to the longitudinal axis of said cylindrical reaction chamber, said oxygen-containing gas and a portion of the methane mixing to form a combustible mixture, burning the combustible mixture to maintain the temperature of the reaction chamber at the acetylene forming temperature of between 2600° F. to 3000° F., the oxygen-containing gas being introduced through said burner port at a sufficiently high velocity and in sufficient quantity to maintain the flame and combustion products by centrifugal force adjacent the whole inner surface of the chamber side wall, thus forming a separating layer of said flame and combustion products between the side wall and the reactant gas mixture in the reaction chamber; immediately shock cooling the effluents of the reaction zone after being in the reaction zone from 0.1 to 0.005 second to a temperature where acetylene is stable and separating the acetylene from the products of combustion.

6. The process of producing acetylene comprising continuously introducing reactant hydrocarbon in the gaseous state into the inlet portion of a reaction chamber having an inlet portion, a generally circular transverse cross section, an open outlet end, and an interior passage unobstructed from and including said inlet portion to and including said outlet end, continuously flowing the reactant hydrocarbon the major portion of the length of said chamber inside said chamber from said inlet portion to said outlet end in a direction parallel to the longitudinal axis of the reaction chamber; introducing oxygen-containing gas into the reaction chamber near the inlet portion through a burner port, said burner port being so positioned as to direct the flow of said oxygen-containing gas in a direction tangent to the inner surface of the side wall and with the predominating component of motion perpendicular to the longitudinal axis of said cylindrical chamber, burning the resulting mixture of reactant hydrocarbon and oxygen-containing gas to maintain the temperature of the reaction chamber at an acetylene forming temperature, the oxygen-containing gas being introduced through said burner port at a sufficiently high velocity and in sufficient quantity as to maintain by centrifugal force the flame and combustion products produced by the oxygen-containing gas adjacent substantially the whole inner surface of the chamber from said inlet portion to said outlet end thus forming a separating layer of said flame and combustion products between the side wall and the reactant mixture in the reaction chamber, cooling the effluents of the reaction chamber to below the acetylene forming temperature and separating the acetylene from the products of combustion.

JOSEPH C. KREJCI.